Patented May 29, 1934

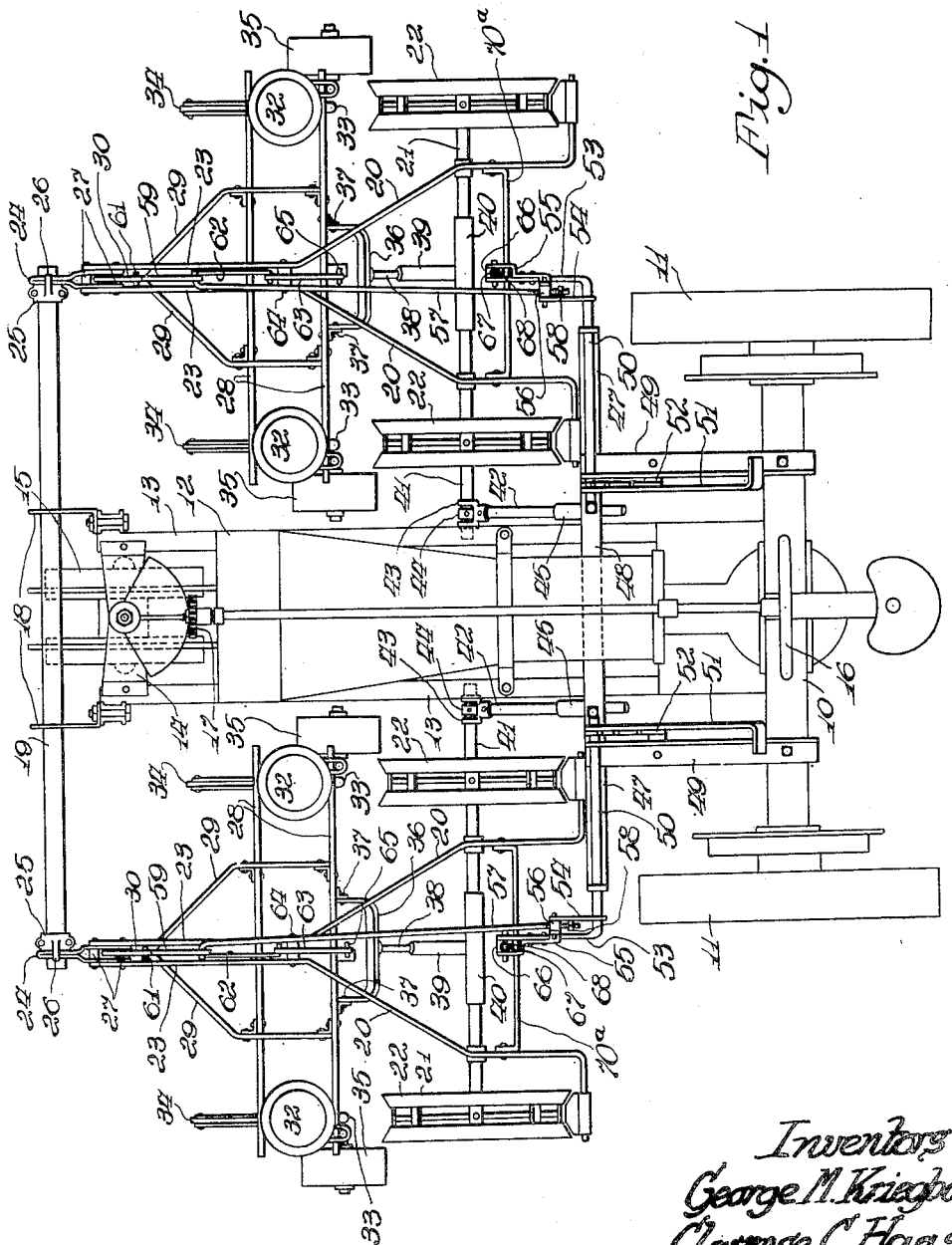

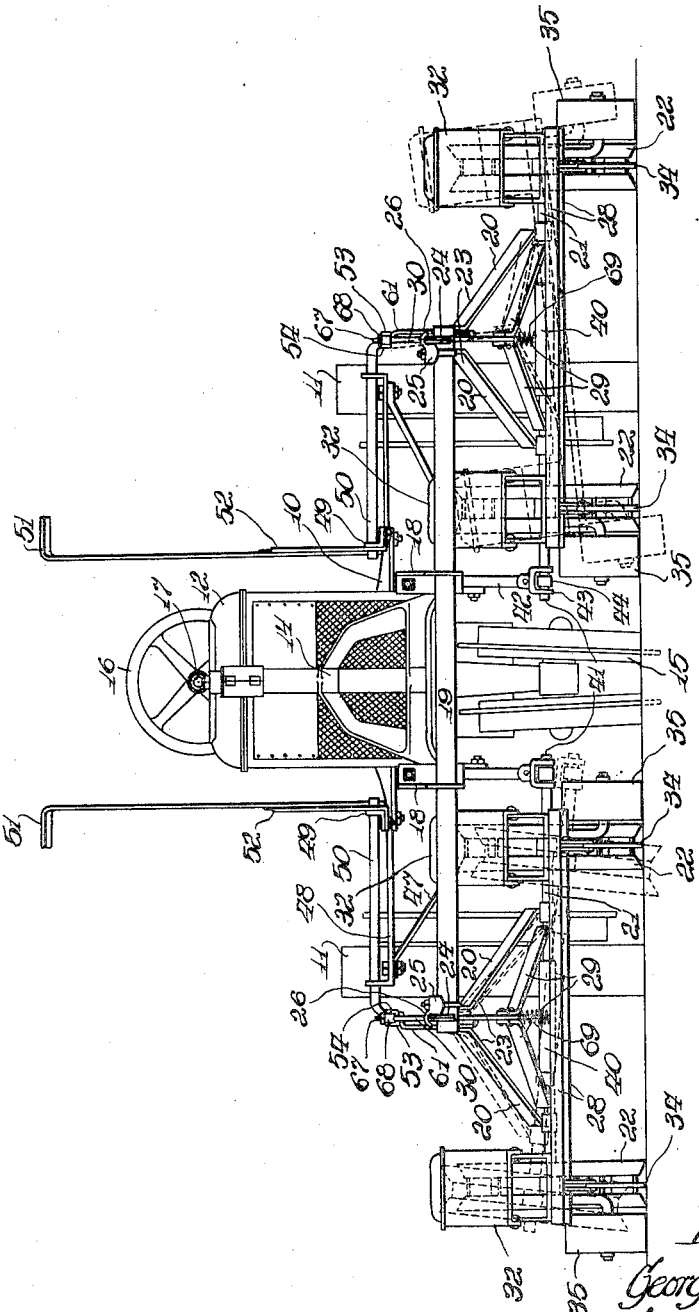

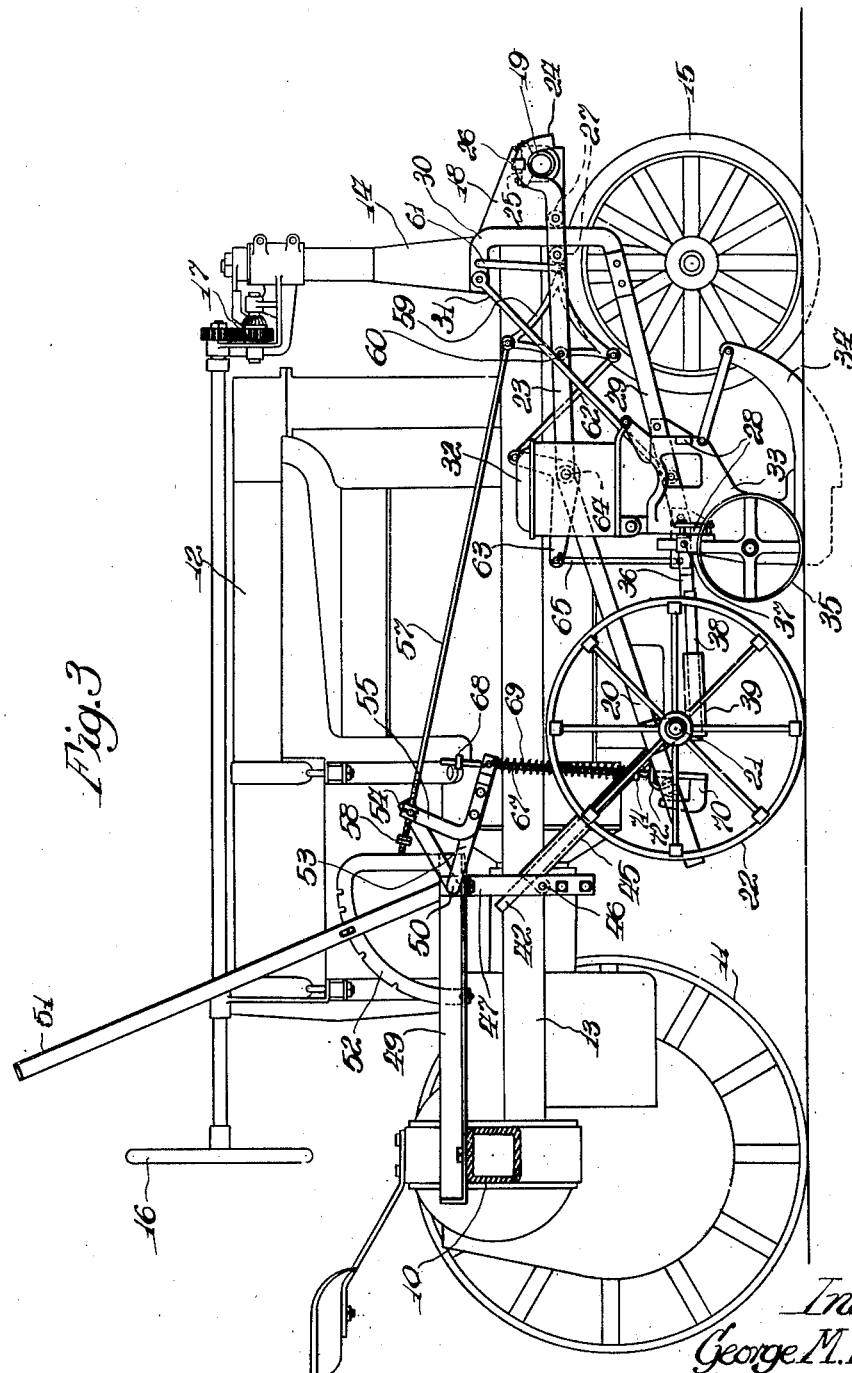

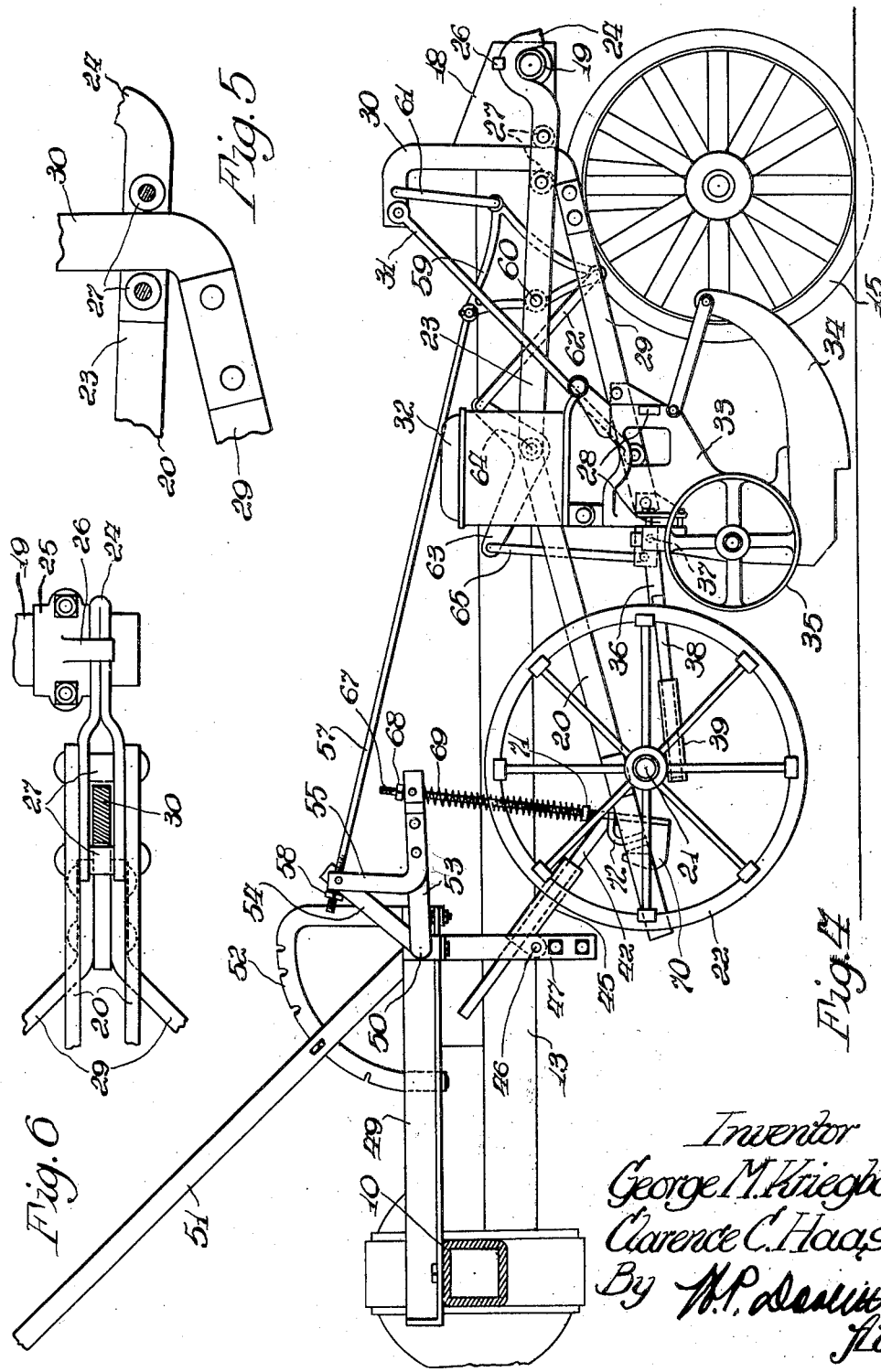

1,960,268

UNITED STATES PATENT OFFICE 1,960,268

TRACTOR PLANTER

George M. Kriegbaum and Clarence C. Haas, Richmond, Ind., assignors to International Harvester Company, a corporation of New Jersey Application November 30, 1932, Serial No. 644,928

8 Claims. (Cl. 97—47)

The present invention relates to tractor propelled planters, and more particularly to those intended for use with row-crop tractors.

In order to obtain a four-row tractor propelled corn planter, it has heretofore been the practice to locate a conventional type of two-row planter at each side of a row-crop tractor for operation in unison and to provide suitable draft means for connecting them to the tractor and suitable lifting means on the tractor for bodily lifting and lowering each planter. While this organization is preferred, it has been found that conventional planters, designed for animal draft and comparatively slow travel, are not sufficiently flexible to permit the seed planting runners to accurately follow irregularities in the soil and plant at even depth under all conditions, and, moreover, are built with a frame structure and ground wheels of a size and weight not altogether desirable for tractor operation.

It is accordingly the main purpose of the present invention to provide a planter structure particularly adapted for tractor propulsion, capable of free floating movement with respect to the tractor and so constructed that the runner frame and wheel frame may have independent vertical and lateral tilting movements. It is also an object of the invention to so connect the parts of the planter frame to each other and to the tractor as to eliminate lateral sway of the planter while preserving the flexibility desired.

The foregoing objects and advantages, as well as others which will become evident from the detailed description to follow, are embodied in the species of the invention herein disclosed and illustrated by the accompanying drawings, where:

Figure 1 is a plan view of a row-crop tractor equipped with two planters embodying the invention;

Figure 2 is a front elevation of the same with possible movements of the planter parts indicated in broken lines;

Figure 3 is a side elevation, showing the planter in lowered or operating position;

Figure 4 is an enlarged side view of the planter and its lifting mechanism, showing the planter as raised from the ground;

Figure 5 is a detail side view of the planter draft connection; and,

Figure 6 is a top view of the connection seen in Figure 5.

In the present instance the invention is illustrated in combination with a row-crop tractor of well known type comprising a wide tread rear axle structure 10 supported on ground wheels 11 and a narrow, longitudinally extending body portion 12 including side sills 13 connected by a crosshead 14 at their forward ends in which the vertical steering post of a narrow tread dirigible truck 15 is mounted. The truck is controlled by means of a steering wheel 16 at the rear of the tractor, the steering shaft of which is connected to the steering post of the truck through suitable gearing at 17.

In the practice of the invention the tractor is provided at the front with supporting brackets 18 at each side, and these carry a fixed, transversely extending draft member 19 which projects beyond each side of the tractor. The respective ends of the draft member 19 carry the coupling elements for two two-row planters, as clearly shown on figures 1 and 2 of the drawings. These planters trail at each side of the body of the tractor and may be either drill or check-row planters, as desired. When check-row corn planters are employed, it will be understood that the seed dropping mechanisms on both planters are operated in unison through suitable flexible operating connections, such, for instance, as shown in the patent to Dennis 1,811,041, June 23, 1931. As the present invention resides in the construction of the individual planters and the manner in which each planter is connected to the tractor, it will be necessary to describe only one of the planters, the constructions at both sides of the tractor being identical.

The respective planters are composed of a main frame or draft frame 20 supported on an axle 21 and ground wheels 22, which also serve as covering wheels. The draft frame 20 is generally horizontal, but preferably inclines upwardly from the axle to a narrowed, straight, forward portion 23 provided at its front end with a draft hook 24 pivoted on the member 19 and loosely held in position by an adjustable collar 25 secured on the member 19 and formed with a hook-shaped lug 26 extending over the coupling hook 24 to form a holding member therefor, which permits both vertical and lateral tilting movements of the draft frame. The narrowed portion 23 of the draft frame is provided near its forward end with two horizontally spaced rollers 27 located between the two flat bars composing the portion 23 of the draft frame. The space between the rollers 27 constitutes a guideway for the draft tongue of a sub-frame now to be described.

The sub-frame, in the present instance, constitutes the runner frame of the planter and is composed of the parallel transverse bars 28 and the forwardly converging bars 29 joined at their forward ends to a vertically extending tongue 30 which is loosely received in the guideway between the rollers 27 on the draft frame. The tongue member 30 extends above the draft frame, as shown in Figures 3 and 4, and may be provided with a rearwardly extending end portion connected to the runner frame by brace bars 31. The respective ends of the parallel, transverse frame bars 28 have mounted thereon the usual seed dispensing hoppers 32 which discharge through the boots 33 carrying the usual furrow forming runners 34. Each runner frame at its outer side carries a gauge wheel 35 adapted to support the runner frame when planting and to gauge the ground penetration of the runners and, therefore, the depth of planting. As it is a purpose of the invention to provide free floating movement for the runner frame while maintaining it in alignment with the draft frame, the rear bar 28 of the runner frame carries a yoke-shaped bar or member 36, the arms of which are pivoted to the rear bar 28 at 37 on a transverse, horizontal axis. At its center, the member 36 has fixed to it a rearwardly projecting cylindrical guide-bar 38 which telescopes a tubular bearing member or socket 39 fixed on a sleeve 40 journaled on the axle 21. Through this arrangement the runner frame is free to rise and fall on rectilinear lines independently of the draft frame, as the tongue 30 will move up and down in the guideway on the draft frame, and the slidable or telescopic connection between the runner frame and the draft frame at the rear will permit corresponding movement there. At the same time, the connections between the runner frame and the draft frame afford sufficient rotary movement or play to permit the tilting movement indicated at the right side of Figure 2, but lateral horizontal movement is prevented by the connections described. It is, therefore, possible for each seed dispensing unit to follow the contour of the soil accurately and maintain an even depth of planting.

In order to provide a similar latitude of movement for the draft frame while maintaining it in fixed spaced relation to the side of the tractor, the inner end of the axle 21 is extended, as at 41, to form the support for a cylindrical guide-rod 42, which has a forked end piece 43 journaled on the extended end 41 of the axle and held in position by an adjustable set-collar 44 thereon. The guide-rod or bar 42 telescopes with a tubular bearing sleeve 45, the upper end of which is pivoted at 46 to a bracket member 47 mounted on the sill member 13 of the tractor. This connection permits the draft frame to rise and fall and is sufficiently loose to permit the degree of tilting movement indicated at the left side of Figure 2, thereby assuring that the covering wheels will also follow the variations in the soil surface.

The independently floating draft and runner frames are simultaneously lifted and lowered by a unitary control means mounted on the tractor, which is so constructed as to provide a level lift for the runner frame while not interfering with the desired floating movements of the planter while in operation. This lifting mechanism is preferably supported on a transversely extending member 48 (Figure 1) which projects at each side of the body of the tractor just forward of the traction wheels and is carried on the bracket members 47 secured to the sills 13. The transverse member 48 and bracket members 47 are braced and further secured to the tractor by rearwardly extending bars 49 secured at their rear ends on the axle structure 10. Each projecting end of the transverse member 48 has journaled thereon a rockshaft 50 secured to a hand lever 51 at its inner end, which cooperates with a rack 52 for locking it in adjusted position. At its outer end the rockshaft 50 is formed with angularly offset crank arms 53 and 54 which are joined by a strap 55 which is shaped to provide spaced arms at the ends of the respective crank arms. At the end of the crank arm 54, the spaced arms or members so formed receive the trunnions of a pivoted collar 56, through which there passes the rear end of a lifting rod 57 which carries a stop nut 58 adapted to engage the rear side of the collar 56. At its forward end, the rod 57 is pivoted to a triangular, rocking member or lever 59 pivoted at 60 between the bars forming the narrowed portion 23 of the draft frame. At one of its other angles the member 59 is pivoted on a link 61, which is pivotally connected to the upper end of the tongue 30 of the runner frame. At its third or lower angle, the rocking member 59 is pivoted to a link 62, which is also pivotally connected to one arm of a bell crank lever, or rocking member, 63 pivoted between its ends on the draft frame at 64. The other arm of the bell crank lever 63 is pivoted to a depending link 65, the lower end of which is pivoted to the rear, transverse bar of the runner frame. With this arrangement, rearward swinging movement of the lifting lever 51 will rock the members or levers 59 and 63 in opposite directions, thereby lifting both the front and rear ends of the runner frame with respect to the draft frame to a substantially equal degree to effect a rectilinear or level lift thereof on the runner frame. Reverse movement of the lever 51 will similarly lower the runner frame with respect to the draft frame and, after the runner frame reaches the ground, the stop 58 on the upper end of the lifting rod 57 will be freed from the crank arm 54 by further movement of the lever 51, and allow for floating movement of the runner frame.

In order to effect simultaneous lifting and lowering movement of the draft frame, the crank arm 53 also carries a pivoted collar 66 at its end, through which there passes a lifting rod 67 provided at its lower end with a rearwardly extended hooked arm 70 adapted to engage under a crossbar 70ª on the rear of the draft frame. The lifting link 67 is likewise provided with a stop nut 68 at its upper end adapted to engage the upper side of the collar 66 when the lever 51 is swung rearwardly to lift the planter. A pressure spring 69 is provided on the link 67, which abuts an adjustable set collar 71 on the lower portion of rod 67. Below this collar the rod 67 passes freely through a guide bracket 72 on the crossbar 70ª. A certain extent of lost motion is thus provided between the lifting rod and draft frame to allow free floating movement thereof. As will be understood from the illustrations in Figures 3 and 4, the lifting connection to the draft frame will pick up and lift that frame simultaneously with the runner frame, and, as the runner frame is lifted with respect to the draft frame, the draft frame is being lifted from the ground and both are thus being lifted with respect to the tractor, and vice versa. When, as is the usual practice, the seeding mechanisms are driven from the axle of the covering wheels, the drive will be interrupted when the draft frame is raised from the ground.

It will accordingly be seen that the construction above described provides a planter of light construction and of great flexibility, and that the relation of the planter parts to the tractor is such that it can be readily lifted and lowered to a degree assuring ample clearance above the ground, when lifted. It will be further seen that, although great flexibility as to vertical floating movement and lateral tilting movement is provided, the runner frame and draft frame of the planter are nevertheless always maintained in proper alignment and are limited to movements in longitudinal and transverse vertical planes, and moreover that the planter is at all times maintained in proper spaced relation to the side of the tractor.

The foregoing construction is illustrative of the preferred embodiment of the invention, but it will be understood that details of construction are susceptible of variation without departure from the scope of the invention as defined in the following claims.

What is claimed is:

1. The combination with a tractor of a draft member secured on the tractor, an implement comprising a wheel supported draft frame having a forward extension coupled to the draft member for vertical movement and a sub-frame connected to said draft frame for independent vertical movement on rectilinear lines, and unitary lifting mechanism on the tractor connected to both the draft frame and sub-frame including means for moving the sub-frame vertically with respect to the draft frame as the draft frame is moved vertically about its coupling to the draft member.

2. The combination with a tractor of a draft member secured on the tractor, an implement comprising a wheel supported draft frame having a forward extension coupled to the draft member for vertical movement and a sub-frame connected to the draft frame for independent vertical movement on rectilinear lines, means on the draft frame for lifting and lowering the sub-frame with respect thereto comprising interconnected lifting means at the front and rear of the sub-frame, and unitary means on the tractor for lifting and lowering the draft frame and for simultaneously actuating the lifting connections of the sub-frame.

3. The combination with a tractor of a draft member secured on the tractor, an implement comprising a wheel supported draft frame having a forward extension coupled to the draft member for vertical movement and a sub-frame connected to the draft frame for independent vertical movement, means on the draft frame for lifting and lowering the sub-frame with respect thereto, unitary means on the tractor for lifting and lowering the draft frame and for simultaneously actuating the lifting and lowering means for the sub-frame, and means between the tractor and the draft frame and between the draft frame and the sub-frame for confining relative movements thereof to vertical planes.

4. The combination with a tractor of a laterally projecting draft member at the front thereof, a planter positioned at the side of the tractor and comprising a draft frame having a forwardly extended portion coupled to the draft member for vertical movement, an axle and wheels supporting the rear of said frame, a runner frame beneath the draft frame forward of the axle and connected to the draft frame by longitudinally spaced slidable and tiltable connections to afford free floating and tilting movements of the runner frame, guide means between the rear of the draft frame and the tractor for maintaining them in parallel relation during vertical movement, and means on the tractor for simultaneously lifting and lowering both frames.

5. The combination with a tractor of a laterally projecting draft member at the front thereof, a planter positioned at the side of the tractor and comprising a wheel supported draft frame coupled to the draft member for vertical movement, telescopically related slide members lying in a vertical plane parallel to the longitudinal axis of the tractor and respectively pivoted on the tractor and the rear portion of the draft frame for maintaining the draft frame in fixed parallel relation to the tractor, a runner frame connected to the draft frame for independent vertical movement, and telescopically related slide members respectively pivoted on the draft and runner frame for maintaining said frames in fixed relation horizontally.

6. In a tractor planter, a horizontally extended draft frame having supporting wheels on the rear thereof, means at its forward end for connection to a tractor, a runner frame positioned beneath the draft frame forwardly of the supporting wheels, a draft tongue on the runner frame having a vertical portion slidably and tiltably mounted on the draft frame, and a connection between the rear portions of the draft and runner frames including slidably related members restricting relative movement of said frames to vertical planes.

7. In a tractor planter, a horizontally extended draft frame having an axle and supporting wheels on the rear thereof, means at its forward end for connection to a tractor, a runner frame positioned beneath the draft frame forwardly of the axle, a draft tongue on the runner frame having a vertical portion slidably and tiltably mounted on the draft frame near its forward end, a guide-bar pivoted at one end to the runner frame on a transverse horizontal axis and extending towards the axle, and means on the axle for slidably receiving the other end of said guide-bar.

8. In a tractor planter, a horizontally extended draft frame including a narrowed forward portion adapted for connection to a tractor and formed with a vertical guideway, an axle and supporting wheels on the rear thereof, a runner frame positioned beneath the draft frame forwardly of the axle, a draft tongue on the runner frame having its forward end extended vertically and loosely received in said guideway, a cylindrical guide-bar provided with a forked end the arms of which are pivoted on the rear of the runner frame on a transverse horizontal axis, and a pivotally mounted tubular member mounted on the axle and receiving said guide-bar for both axial and rotary movements.

GEORGE M. KRIEGBAUM.
CLARENCE C. HAAS.